United States Patent [19]
Tews

[11] Patent Number: 5,957,441
[45] Date of Patent: Sep. 28, 1999

[54] HOURGLASS-SHAPED ELASTOMERIC COMPRESSION SPRING

[75] Inventor: Kevin B. Tews, Lansing, Ill.

[73] Assignee: Miner Enterprises, Inc., Geneva, Ill.

[21] Appl. No.: 08/925,832

[22] Filed: Sep. 5, 1997

[51] Int. Cl.$^6$ .................................................. F16F 1/36
[52] U.S. Cl. .......................................... 267/153; 267/292
[58] Field of Search ................................. 267/152, 153, 267/141.1, 292; 280/275, 276, 279, 283, 284

[56] References Cited

U.S. PATENT DOCUMENTS

| | | | |
|---|---|---|---|
| 2,713,483 | 6/1955 | Tillou ........................................ | 267/153 |
| 3,134,585 | 5/1964 | Trask ......................................... | 267/153 |
| 3,202,412 | 8/1965 | Trask ......................................... | 267/153 |
| 3,315,951 | 4/1967 | Boschi et al. ............................ | 267/153 |
| 3,409,284 | 11/1968 | Rix ............................................. | 267/153 |
| 3,434,708 | 3/1969 | Hawk, Jr. ................................. | 267/153 |
| 4,198,037 | 4/1980 | Anderson . | |
| 4,566,678 | 1/1986 | Anderson . | |
| 5,141,697 | 8/1992 | Wydra . | |
| 5,192,057 | 3/1993 | Wydra et al. . | |
| 5,280,890 | 1/1994 | Wydra ....................................... | 267/153 |
| 5,326,083 | 7/1994 | Wydra et al. . | |
| 5,364,086 | 11/1994 | Paton ........................................ | 267/153 |
| 5,460,357 | 10/1995 | Stewart .................................... | 267/153 |

Primary Examiner—Robert J. Oberleitner
Assistant Examiner—Pamela J. Lipka
Attorney, Agent, or Firm—J. W. Harbst

[57] ABSTRACT

A compression spring formed from an elastomer member having a ratio of plastic strain to elastic strain that is greater than 1.5 to 1 is disclosed. The elastomer spring member defines an elongated axis between opposed ends of the spring and has a molecular structure. A periphery of the elastomer member has a series of axially spaced annular portions of increased cross-sectional area with an annular waistline portion disposed between adjacent annular portions of increased cross-sectional area to provide the elongated member with a series of axially spaced hourglass configurations arranged in end-to-end relation relative to each other. The hourglass configurations along the periphery of the elastomer member allowing the elastomeric spring to collapse upon itself during compression thereof while maintaining a substantially constant outside diameter for the areas of increased cross-sectional area. The internal molecular structure in each annular portion of increased cross-sectional area along with the annular waistline portion being oriented in a predetermined manner during precompression of the elastomeric member to eliminate any compression set characteristic of the elastomer material.

16 Claims, 4 Drawing Sheets

HOURGLASS-SHAPED ELASTOMERIC COMPRESSION SPRING

BACKGROUND OF THE INVENTION

1. Field of the Invention

This invention relates to elastomeric compression springs. The preferred embodiment of our invention is primarily directed to a novel compression spring formed from an hourglass-shaped preform that is orientated to provide a spring having substantial deflection over a predetermined operating range with minimal bulge outwardly. The invention has broad varied applications that may include use in the front suspension fork of a mountain bike or the suspension of an off-highway mining truck. Applications wherein a guiding device, such as a tube or guide rod, is employed or where it is necessary to remove tolerance differences in a pad stack without causing a preload are also foreseen.

2. Related Art

Present designs of mountain bikes and off-the-road bicycles employ front fork suspension systems formed of a microcellular urethane spring encapsulated within a cylindrical unit that is interconnected between the front fork of a bicycle and its frame. These designs present problems because such urethanes absorb moisture that affects their proper functioning, lack integrity and durability due to flaking, and have a spring rate that imposes the additional cost of a dampener upon the manufacturer.

Also related to this application are spring elements formed of the same material as the instant invention and whose molecular structure is oriented through a similar process. The first in a series of these spring element patents are in U.S. Pat. No. 4,198,037 and U.S. Pat. No. 4,566,678 to David G. Anderson and assigned to the assignee of the present application. The thermoplastic elastomer discussed in these references is a copolyester polymer elastomer such as sold by E. I. DuPont de Nemoirs of Wilmington, Del. under the Trademark "HYTREL®". Each of these patents focuses on a method of manufacture of compression springs from HYTREL material and its associated compression set problems. Both are primarily directed to applications requiring very high spring rate for absorbing substantial quantities of energy in applications such as in the railcar industry.

SUMMARY OF INVENTION

This invention is an hourglass compression spring either solid or having a center aperture or bore for absorbing energy in a generally vertical direction. It is manufactured from an elastomer whose ratio of plastic deformation to its elastic deformation is greater than 1.5 to 1. Preferably, the elastomer is the HYTREL polyester polymer of the DuPont company. In the preferred embodiment the hourglass body which can be solid or have a bore therethrough is precompressed during manufacture to eliminate any compression set problems and provide maximum molecular orientation and energy absorption. More specifically, an elastomeric compression spring is formed in which the hourglass shape has been deformed by precompression by at least 30% of its length so as to overcome the compression set characteristic of the elastomer, to orient its molecular structure and to provide for the relatively constant spring rate.

Accordingly, the objects of this invention are to provide, inter alia:

1) a unique elastomeric compression spring having a generally hourglass shape and being either solid or having a bore therethrough to absorb energy in a generally angular compression stroke over a predefined effective operating range;

2) an elastomeric hourglass-shaped spring which during the first portion of the operating range can sustain deflection with little increase in resistance;

3) an elastomeric hourglass-shaped spring which upon loading over a predetermined effective operating range, collapses upon itself and does not increase generally its external diameter;

4) an elastomeric hourglass-shaped spring which bulges very little over a predetermined effective operating range such that a guide tube or a guide rod passing through the center thereof can be employed for stability;

5) an elastomeric hourglass-shaped spring which bulges very little during compression and which can have a bore of various sizes therethrough to vary the load deflection curve;

6) a pad stack of elastomeric hourglass-shaped springs carried in a guide tube which bulge outwardly very little during compression and have a hole therethrough;

7) a thermoplastic elastomer hourglass-shaped spring which includes at least three areas wherein its molecular structure has been orientated; and 8) a thermoplastic elastomeric hourglass-shaped spring having an aperture passing along its major axis which includes at least two areas wherein its molecular structure has been orientated.

DESCRIPTION OF THE DRAWINGS

The manner in which these objectives and other desirable characteristics can be obtained from this invention is explained in the following specification and attached drawings in which.

DETAILED DESCRIPTION

Figure 3:
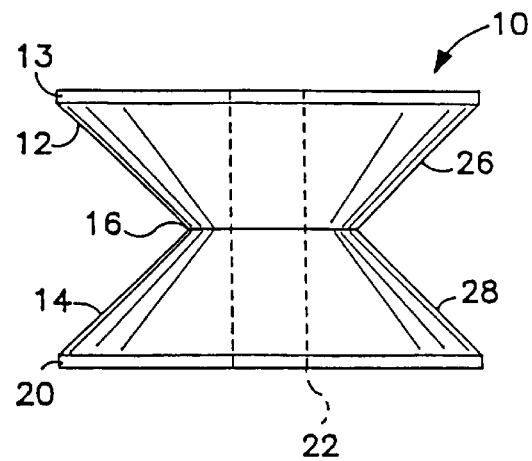
FIG. 3 is a side elevational view of a preferred embodiment of a molded hourglass-shaped preform of the elastomeric pad used in the compression spring unit of this invention and having a center bore as indicated by the dotted lines.
Figure 4:
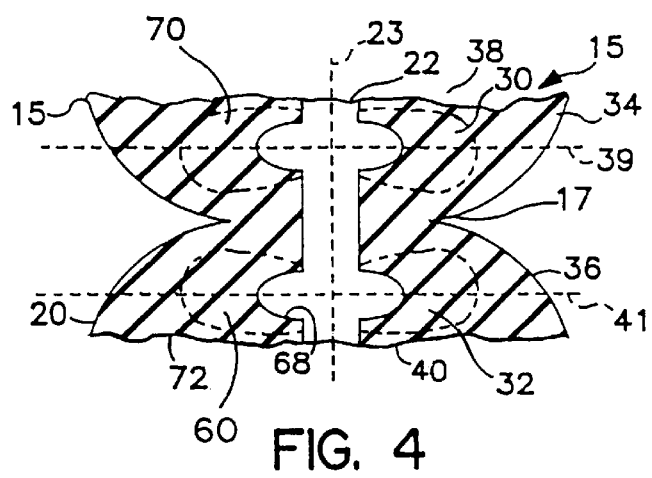
FIG. 4 is a side elevational view, in section, of a preferred embodiment of our invention having a center bore after the application and removal of a compressive force to the preform body shown generally in FIG. 3.

Referring to FIG. 3, the new elastomeric preform configuration 10 comprises a generally hourglass shape. The preform configuration 10 includes upper and lower sections 12 and 14 which are connected by a waistline section 16. Flats 18 and 20 are provided at the extremes of the sections 12 and 14 for contact, for example, with the inner wall of a guiding tube (not shown), whereby heat may be transmitted from the elastomeric spring once formed to the guiding tube during a normal work cycle. A center aperture or bore 22 may be provided, for example, to allow the passage of a guide rod, if a guide tube is not employed. As shown in FIG. 4, in the compression spring 15, the aperture 22 extends generally parallel with the major axis 23 through the top 38 and the base 40. Although not shown in the Figures, the hourglass shape, such as shown in FIG. 4, if viewed from the top or bottom is round as is an hourglass device employed for measuring time.

Figure 2:
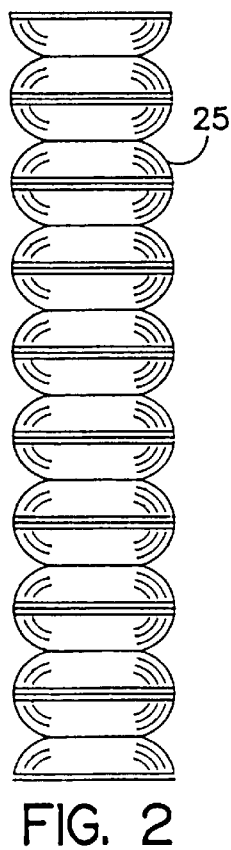
FIG. 2 is a side elevational view of a stack of elastomeric hourglass-shaped springs.
Figure 5:
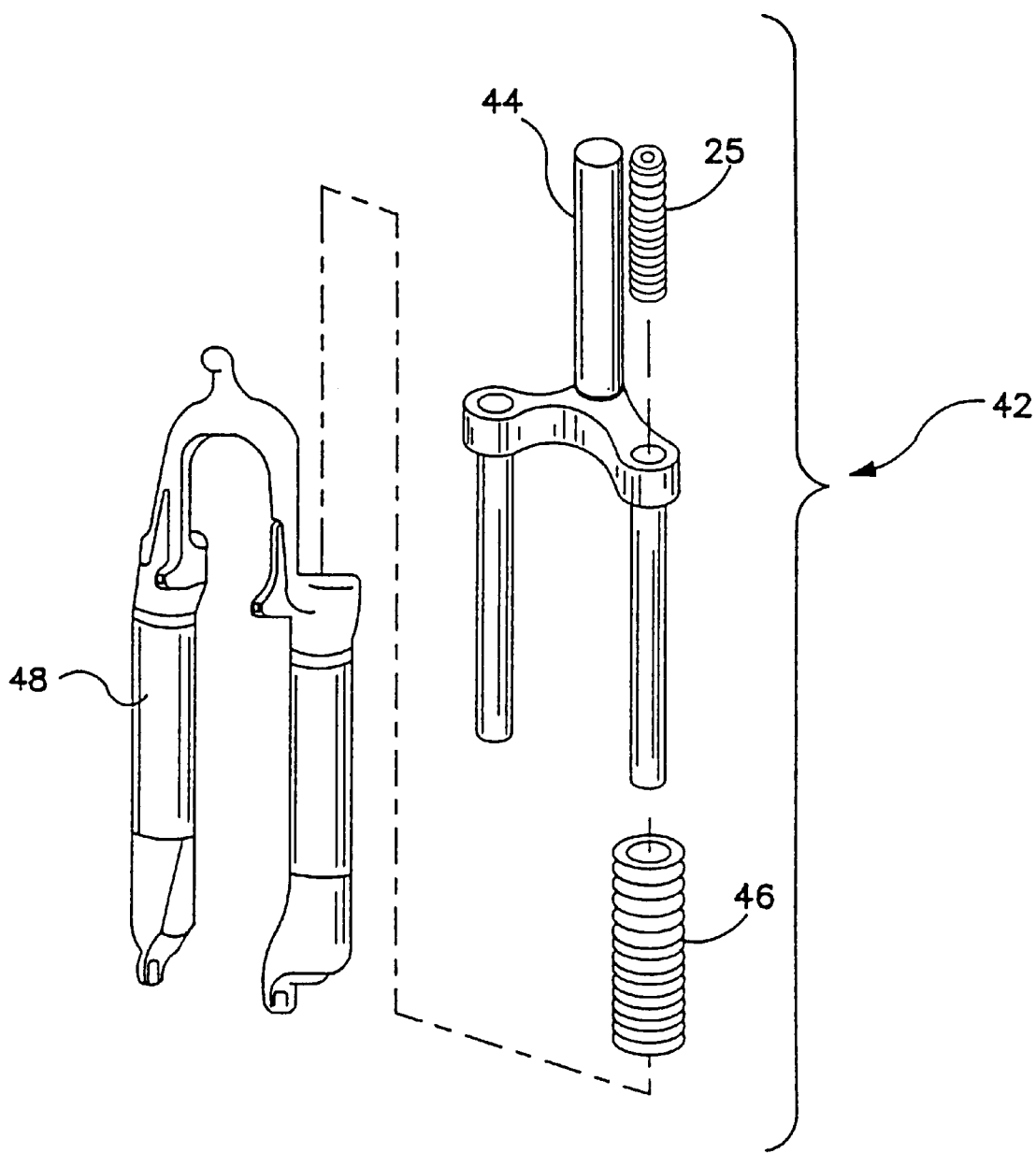
FIG. 5 is generally an exploded view of several elements of the front fork of a mountain bike incorporating the elastomeric hourglass-shaped spring of the present invention.
Figure 6:
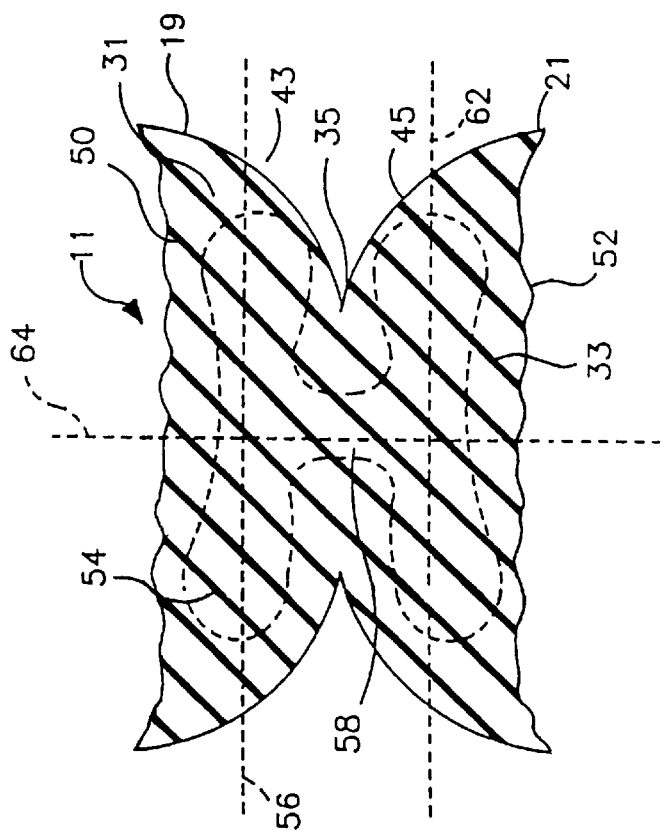
FIG. 6 is a side elevational view, in section, having no center bore, that is solid, after the application and removal of a compressive force to a solid preform similar to that shown in FIG. 3.

Reference should be made to FIG. 6 wherein an elastomeric spring 11 is shown without the center aperture which as is apparent was formed from a preform without a center aperture. For the purposes of constructing a pad stack 25, such as shown in FIG. 2, it has been determined that the judicious employment of a center aperture, such as 22, allows further variance of the force deflection curve, as well as provides guidance. For example, the inclusion of an aperture in the elastomer spring shown in FIG. 4 provides a softer spring, as compared to a similar elastomer spring, as in FIG. 6, without an aperture. An example of such a pad stack having an aperture is shown in FIG. 5 and identified as number 27.

As with the prior art springs identified in the above U.S. Patents, the preform configuration 10 shown in FIG. 3 requires precompression of at least 30% of its length in order to overcome the compression set characteristic of HYTREL and to orientate the molecular structure. Such is effected by placing the preform into a compression press and applying sufficient force to compress the preform to a predetermined position. Molecular orientation can be determined from visual inspection of the elastomeric spring after cross-sectioning thereof. The areas of orientation appear amber in color and slightly translucent while the unorientated material looks like basic virgin HYTREL, white/brown in color and not translucent. It should be noted that I believe that the areas amber in color and slightly translucent are associated with orientation, but I do not know that for sure. I do know that these areas are associated with spring abilities of the finished product. The more area or areas amber in color and slightly translucent, the better the spring characteristics of the finished product. Upon release of the pressure, the preform configuration 10 has taken the shape 15 depicted in FIG. 4 in which the upper and lower sections 12 and 14 of FIG. 3 have been permanently deformed to define upper portion 30 and lower portion 32 having slightly curved or bent upper and lower side wall sections 34 and 36. As is apparent, depending on the particular shape of the original hourglass preform and the amount of compression applied by the compression press, the side wall sections 34 and 36 could have any degree of bulge beyond that of the smooth, flat configuration of side walls 26 and 28 of preform configuration 10. The upper portion 30 includes a top 38 and a minor axis 39 and the lower portion 32 has a base 40 and a minor axis 41. The upper and lower side wall sections 34 and 36 joining the top 38 and base 40 with the waistline portion 17.

Figure 7:
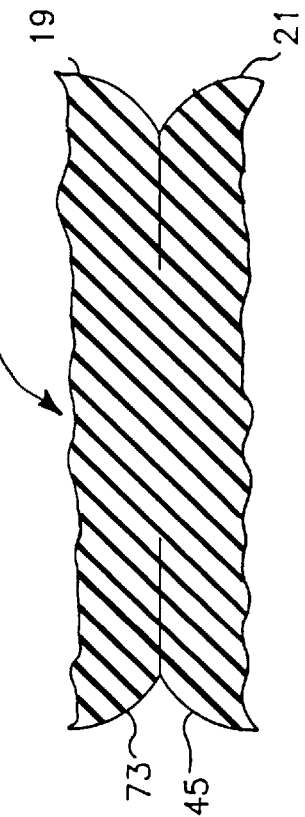
FIG. 7 is a side elevational view in section of the spring of FIG. 6 compressed beyond the effective operating range of the front fork of a mountain bike, but suitable for other applications.

Referring to FIGS. 6 and 7, which is another embodiment of the invention hereunder consideration, but lacking a center aperture 22 as in FIG. 4. The elastomer spring 11 referred to in FIG. 6 and FIG. 7 includes upper and lower portions 31 and 33 joined together by a waistline portion 35. The upper portion 31 having a top 50 and the lower portion 33 having a base 52. Based upon an examination of an elastomer spring cut as is elastomer spring 11 in FIG. 6, certain patterns respecting molecular orientation are apparent in the HYTREL. It is my belief, as stated above, that when the molecular structure of a HYTREL preform is orientated during precompression (the first compression) whereby eliminating compression set characteristics of the elastomer material, that the areas of molecular orientation are a different color than that of unorientated material. In an examination of a sample of a solid elastomer spring such as elastomeric spring 11, three areas of a different color are noted. The first area 54 is in upper portion 31 and extends along the minor axis 56 in the form of a band or layer. The second area 58 of color exists in the waistline portion 35 and the third area 60 also as a band or layer exists in the lower portion 33 and extends along the minor axis 62 thereof also as a band or layer; both of the minor axes 56 and 62 being perpendicular to the major axis 64 of the elastomeric spring 11.

Based upon our belief of these relations between the color of the elastomer material after precompression, reference should be made back to FIGS. 3 and 4. Upon precompression of the preform configuration 10 of FIG. 3, the compression spring 15 results, which it was discovered had enlarged upper and lower symmetrical sections 66 and 68 formed in the center aperture 22. Because of the amber color and slight translucence of the elastomer material in the area 70 generally adjacent the upper enlarged symmetrical section 66 and area 72 generally adjacent the lower enlarged symmetrical section 68, I believe that molecular structure orientation has occurred in these areas. Although not shown, the areas 70 and 72 extend in a donut-like band around the circumference of the upper and lower symmetrical sections 66 and 68.

Figure 1:
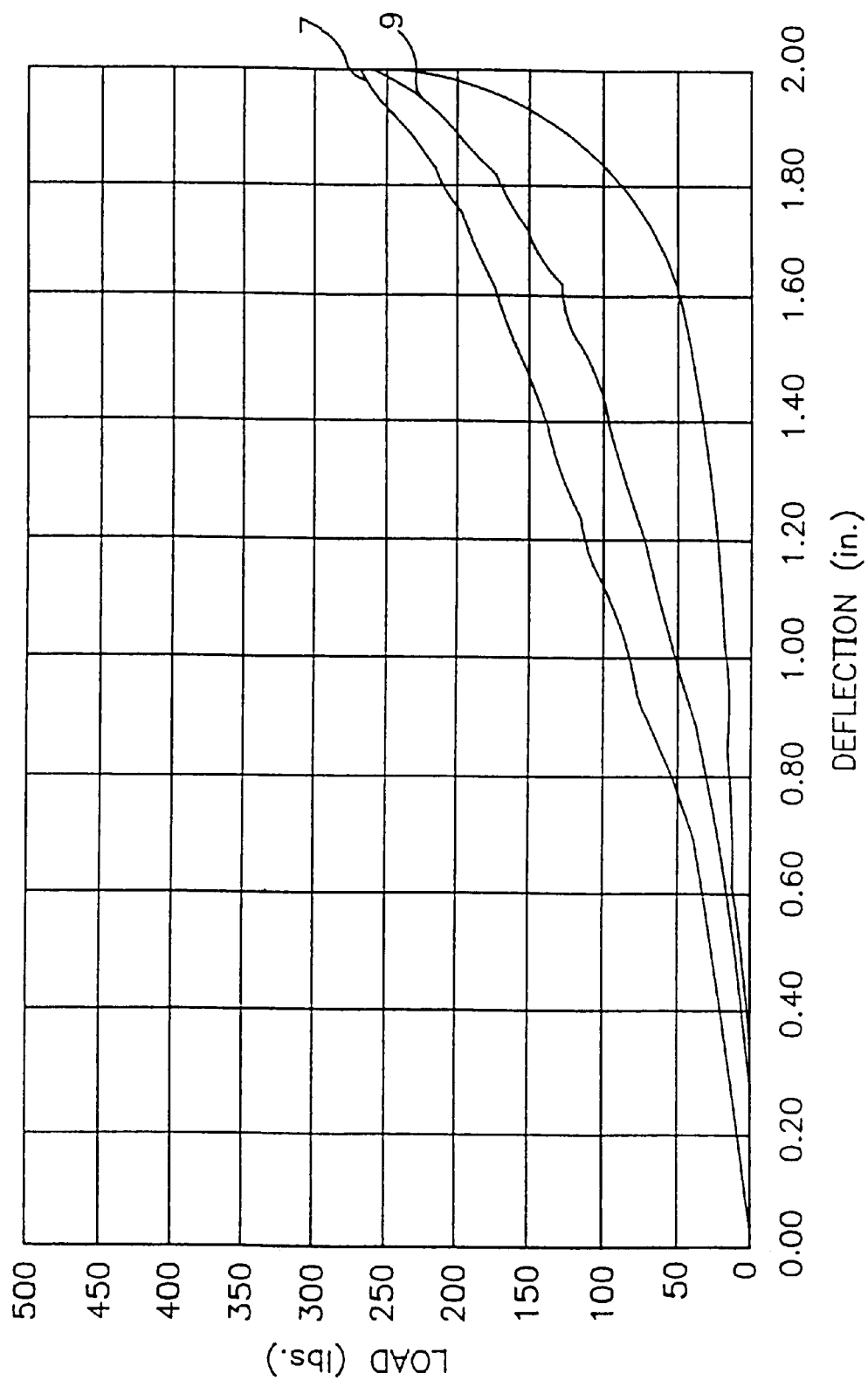
FIG. 1 is an illustrative displacement graph comparing the force displacement of an elastomeric hourglass-shaped spring.

The elastomeric spring for the front fork of a bike is used with a guide device over its operating range as defined, for example, by the force deflection curve of FIG. 1 which represents the first and fourth closures 7 and 9. The upper limit of the operating range is at the point where the bulge, due to compression, causes the flats 19 and 21 to interact with the guiding device to effect the load deflection curve. That is, the elastomeric spring bulges such that the flats 19 and 21, besides allowing heat transfer, grab either the side walls of the guide tube. We have found that the degree of bulge sufficient to effect the load deflection curve is reflected by the degree of close-out of the upper and lower wall sections 43 and 45, represented in FIG. 7.

The elastomeric spring 11 shown in FIG. 7 has been closed-out, "or compressed" to a point where it is above the effective operating range of the front fork of a mountain bike. It must be understood, however, that the closed-out elastomeric spring 11, shown in FIG. 7, is still a very effective spring if subjected to increased loading. Compression beyond close-out is associated with bulge and so results in problems if the tube is the upper tube assembly of a mountain bike. Referring to FIG. 5, there is shown parts of the front fork 42 of a bike. These include: the pad stack 25, an upper tube assembly 44, a fork boot 46 and a fork 48. Closing-out of individual springs of pad stack 25 shown in FIG. 5 would result in an undesirable performance.

Persons skilled in the art of plastic forming and compression spring design will discover that many modifications of our inventions will produce satisfactory results. For example, upper and lower side walls of the preform can be made having different angles to each other, or the waistline can be made thicker or thinner. As another alternative, orientable elastomers other than HYTREL may be acceptable for some applications. These and other variations which will be appreciated by those skilled in the art, are within the intended scope of our invention as claimed below:

We claim:

1. An axially elongated elastomeric spring for use within a hollow guiding device, said elastomeric spring having an effective operating range defined between zero deflection and excessive deflection which causes radial outward bulging of the spring sufficient to establish an interaction between an outer diameter of the elastometic spring and the guiding device thereby effecting the load deflection curve of the spring, said elastometic spring comprising:

an axially stacked series of one-piece spring units for absorbing impacts imparted to said spring, said stacked series of spring units combining to define an elongated axis for said spring;

with each spring unit being foamed of an elastomer material having a molecular structure and a ratio of plastic strain to elastic strain that is greater than 1.5 to 1, the molecular structure of at least one portion of each spring unit being orientated in at least one direction; and wherein each spring unit is configured with annular upper and lower portions joined together by an annular waistline portion, with the annularly configured upper and lower portions having generally coequal outside diameters which are both greater than an outer diameter of said waistline portion such that each spring unit has a generally hourglass configuration, with the upper portion of each spring unit having a top and the lower portion of each spring unit having a base, and with slanting upper and lower wall sections joining said top and said base with said waistline portion whereby during load deflection of said spring the configuration of each spring unit causes the upper and lower wall sections to move toward each other with substantially no increase in the outside diameter of said upper and lower portions of each spring unit thereby maintaining an outer diameter of the spring in radially spaced relation from the guiding device during a spring work cycle.

2. The elastomeric spring as recited in claim 1 in which said generally hourglass shape includes an aperture opening at opposite ends thereof.

3. The elastomeric spring as recited in claim 2 further including an elongated guide rod, said guide rod extending endwise through the apertures defined by said spring units.

4. The elastomeric spring as recited in claim 2 in which each spring unit is deformed by compression by at least 30% of its initial length so as to overcome the compression set characteristic of the elastomer, to orient its molecular structure, and to provide for a relatively constant spring rate.

5. The elastomeric spring as recited in claim 4 wherein, after each spring unit has been deformed by compression, a lengthwise section of an outer wall diameter defining said aperture is radially expanded symmetrically outwardly relative to the elongated axis of the spring unit in both the upper and lower portions of each spring unit.

6. The elastomeric spring as recited in claim 5 wherein molecular structure orientation of the elastomeric material forming each spring unit occurs in an annular band surrounding the radial outward expansion of the aperture in both said upper and said lower portions of each spring unit.

7. The elastomeric spring as recited in claim 1 wherein said upper portion and said lower portion of each spring unit are generally of the same size and shape.

8. The elastomeric spring as recited in claim 1 wherein the upper portion of each spring unit defines a first minor axis and the lower portion of each spring unit defines a second minor axis, and wherein the molecular orientation of the elastomer material of each spring unit generally occurring: in said upper portion of each spring unit along said first minor axis, in said waistline portion, and in said lower portion of each spring unit along said second minor axis.

9. The elastomeric spring as recited in claim 8 in which each spring unit is deformed by compression by at least 30% of its length so as to overcome the compression set characteristic of the elastomer, to orient its molecular structures and to provide for a relatively constant spring rate.

10. A compression spring comprising:

an elongated member formed from an elastomer material having a molecular structure and a ratio of plastic strain to elastic strain that is greater than 1.5 to 1, said elongated member defining an elongated axis for said spring and opposed ends; and wherein a periphery of said elongated elastomer member has a series of axially spaced annular portions of increased cross-sectional area with an annular waistline portion disposed between said annular portions of increased cross-sectional area to provide said elongated member with a series of axially spaced hourglass configurations arranged in end-to-end relation relative to each other, with the hourglass configurations allowing said spring to collapse upon itself during compression thereof while maintaining a substantially constant outside diameter for the annular portions of increased cross-sectional area and wherein internal molecular structure in each of said annular portion of increased cross-sectional area along with said annular waistline portion being oriented in a predetermined manner during precompression to eliminate any compression set characteristic of the elastomer material.

11. The compression spring of claim 10 wherein each annular portion of increased cross-section area defines a minor axis extending generally perpendicular to said elongated axis of said elongated member, said molecular structure orientation in said annular portions of increased cross-sectional area taking place generally along the minor axis of each annular portion of increased cross-sectional area.

12. The compression spring as recited in claim 11 in which the precompression of said elongated member involves compressional deformation of said elongated member by at least 30% of its initial length so as to overcome the compression set characteristic of the elastomer, to orient its molecular structures, and to provide for a relatively constant spring rate.

13. A compression spring comprising:

a one-piece member formed from an elastomer material with a molecular structure and having a ratio of plastic stain to elastic strain that is greater than 1.5 to 1, said member defining a major axis and opposed ends; and wherein said one-piece elastomer member has a series of axially spaced annular portions of increased cross-sectional area with an annular waistline portion disposed between two axially adjacent annular portions of increased cross-sectional area to provide said member with a series of axially spaced hourglass configurations arranged in end-to-end relation relative to each other, said member further defining an aperture extending the length of said elastomer member and opening to said opposed ends thereof, with a peripheral margin of said aperture expanding radially outwardly at each annular portion of increased cross-sectional area such that during precompression of the elastomer member to eliminate any compression set characteristics of the elastomer material, molecular structure orientation of the elastomer material occurs in a generally annular band rounding the radial expansion of the margin of the aperture in each annular portion of increased cross-sectional area on said elastomer member.

14. The compression spring as recited in claim 13 in which the precompression of said one-piece elastomer member involves compressional deformation of said member by at least 30% of its initial length so as to overcome the compression set characteristic of the elastomer, to orient its molecular structure, and to provide for a relatively constant spring rate.

15. The compression spring of claim 14 wherein the radial outward expansion of the margin of the aperture is generally symmetrical about the major axis of the elastomer member.

16. The compression spring of claim 14 the axially spaced annular portions of increased cross-section have generally symmetrical configurations relative to each other.

* * * * *